US008515645B2

(12) United States Patent
Bucci et al.

(10) Patent No.: US 8,515,645 B2

(45) Date of Patent: Aug. 20, 2013

(54) ENGINE IDLE STABILITY CONTROL SYSTEM USING ALTERNATOR FEEDBACK

(75) Inventors: Andrew M. Bucci, Hilliard, OH (US); Todd R. Luken, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 217 days.

(21) Appl. No.: 13/092,180

(22) Filed: Apr. 22, 2011

(65) Prior Publication Data

US 2012/0271525 A1 Oct. 25, 2012

(51) Int. Cl.
*G06F 19/00* (2006.01)
*G06G 7/70* (2006.01)

(52) U.S. Cl.
USPC .......... 701/99

(58) Field of Classification Search
USPC .......... 701/99
See application file for complete search history.

(56) References Cited

U.S. PATENT DOCUMENTS

| | | | | |
|---|---|---|---|---|
| 4,625,281 | A | 11/1986 | Deutsch | |
| 4,730,256 | A * | 3/1988 | Niimi et al. | 701/115 |
| 4,838,223 | A | 6/1989 | Tanabe et al. | |
| 5,030,898 | A * | 7/1991 | Hokanson et al. | 318/146 |
| 5,163,170 | A * | 11/1992 | Grabowski | 318/113 |
| 5,337,013 | A | 8/1994 | Langer et al. | |
| 5,662,084 | A | 9/1997 | Deguchi et al. | |
| 5,730,094 | A * | 3/1998 | Morris | 123/192.1 |
| 6,026,779 | A * | 2/2000 | Obata et al. | 123/295 |
| 6,305,350 | B1 | 10/2001 | Livshiz et al. | |
| 6,600,979 | B1 * | 7/2003 | Kumar et al. | 701/20 |
| 6,622,671 | B2 * | 9/2003 | Uchida | 123/65 PE |
| 6,763,296 | B2 | 7/2004 | Aldrich, III et al. | |
| 6,801,020 | B2 | 10/2004 | Blackburn | |
| 6,815,933 | B2 * | 11/2004 | Taniguchi et al. | 322/28 |
| 6,969,935 | B2 | 11/2005 | Sakakibara et al. | |
| 6,990,953 | B2 | 1/2006 | Nakahara et al. | |
| 7,487,026 | B2 | 2/2009 | Kawashima et al. | |
| 2009/0050107 | A1 | 2/2009 | Fuwa et al. | |
| 2010/0066277 | A1 * | 3/2010 | Bailey | 318/143 |
| 2011/0202222 | A1 * | 8/2011 | Yamamoto | 701/22 |
| 2012/0059537 | A1 * | 3/2012 | Hendrickson et al. | 701/22 |

FOREIGN PATENT DOCUMENTS

| | | |
|---|---|---|
| JP | 09068084 | 3/1997 |

* cited by examiner

*Primary Examiner* — Mary Cheung
*Assistant Examiner* — Frederick Brushaber
(74) *Attorney, Agent, or Firm* — Plumsea Law Group, LLC

(57) ABSTRACT

An engine idle stability control method and system using feedback from alternator of a motor vehicle is described. An excitation current of the alternator is detected and used to predict an alternator torque value. The predicted alternator torque is used to determine an adjustment to engine torque output. Engine torque output is adjusted to compensate for the predicted alternator torque and engine idle stability is maintained.

26 Claims, 8 Drawing Sheets

ENGINE IDLE STABILITY CONTROL SYSTEM USING ALTERNATOR FEEDBACK

BACKGROUND

The present invention relates generally to a motor vehicle, and in particular to an engine idle stability control method and system using feedback from an alternator for a motor vehicle.

An engine in a motor vehicle typically must maintain a target idle speed within a specified range. If the engine speed varies outside the specified range, performance and handling characteristics of the motor vehicle, as well as driving comfort, may become poor. In some cases, if engine speed becomes extremely low, the engine may stall.

When an electric load is applied in a vehicle, for example, a load caused by headlights, a radiator fan, power windows, rear window defroster, or other electric load, the motor vehicle's alternator must increase its output to provide more power for the load. When the alternator increases its output, the alternator torque increases, thereby increasing the engine load. When the alternator torque load varies, the engine idle speed can fluctuate out of the specified range for proper engine idle stability.

Accordingly, there is a need in the art for an engine idle stability control system that can help reduce variation in engine idle caused by changes in alternator torque load.

SUMMARY

In one aspect, the invention provides a method for controlling an engine in a motor vehicle, comprising the steps of: detecting an excitation current associated with an alternator of the motor vehicle; determining a change in the excitation current; comparing the change in the excitation current to a threshold value; determining whether the change in the excitation current is greater than the threshold value; and enabling engine output compensation if the change in the excitation current is determined to be greater than the threshold value.

In another aspect, the invention provides a control system in a motor vehicle for controlling an engine, comprising: an engine; a throttle valve associated with an air intake of the engine, the throttle valve configured to control an amount of air into the engine; an alternator; a current sensor associated with the alternator, the current sensor configured to detect an excitation current of the alternator; an electronic control unit, the electronic control unit in communication with the current sensor and the throttle valve; wherein the electronic control unit comprises a processor configured to detect an excitation current associated with the alternator of the motor vehicle from the current sensor and to control the throttle valve associated with the air intake of the engine when a change in the detected excitation current exceeds a threshold value.

In another aspect, the invention provides a method for controlling engine idle stability of an engine in a motor vehicle, comprising the steps of: detecting an excitation current associated with an alternator of the motor vehicle; determining whether a change in the excitation current is greater than a threshold value; enabling engine output compensation if the change in the excitation current is determined to be greater than the threshold value; wherein the step of enabling engine output compensation further comprises: determining a predicted alternator output torque value; calculating a predicted change in engine output torque based on the predicted alternator output torque value and a current engine output torque; and adjusting the engine torque output to compensate for the calculated predicted change in engine output torque.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
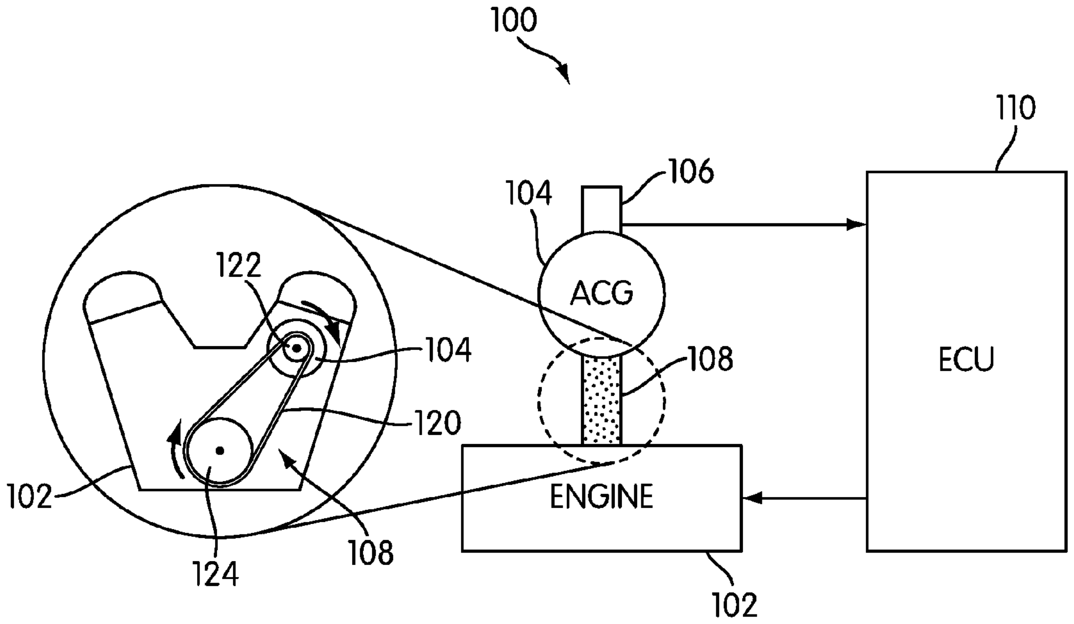
FIG. 1 is a schematic view of an embodiment of an engine idle stability control system for a motor vehicle.

FIG. 1 is a schematic view of an exemplary embodiment of an engine idle stability control system 100 for a motor vehicle. The term "motor vehicle" as used throughout this detailed description and in the claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

In some embodiments, engine idle stability control system 100 may include one or more components typically associated with a motor vehicle. In some embodiments, engine idle stability control system 100 may include one or more engines. In an exemplary embodiment, the motor vehicle may include an engine 102. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drive train is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

For purposes of clarity, engine 102 is shown schematically in the current embodiment. In various embodiments, engine 102 could have any shape, size or configuration. Moreover, engine 102 could be an internal combustion engine having any number of cylinders. In some embodiments, engine 102 may include an air intake configured to provide a mixture of air and fuel to engine 102. The air intake also may include a throttle valve disposed in air intake. The throttle valve may be configured to open and close so as to allow more or less air into the air intake.

In some embodiments, engine 102 may be associated with a drive system 108. In some embodiments, drive system 108 may be a mechanical connection linking one or more components of the motor vehicle with engine 102. In one embodiment, drive system 108 connects engine 102 and an alternator (ACG) 104. In an exemplary embodiment, drive system 108 may be belt driven. In this case, drive system 108 may further include a belt 120. In some cases, belt 120 may be an endless belt that connects one or more components. In some cases, belt 120 may be a serpentine belt. In other embodiments, drive system 108 may be a different type of mechanical connection.

In some cases, drive system 108 may include one or more pulleys. In one embodiment, drive system 108 may include a driving pulley 124. Driving pulley 124 may engage the end of an output shaft of engine 102 and may be used for driving belt 120. In addition, drive system 108 may further include one or more driven pulleys. In different embodiments, the number of driven pulleys may vary. In the current embodiment, drive system 108 is shown with one driven pulley. In this embodiment, the driven pulley is an alternator pulley 122 associated with alternator 104. In other embodiments, however, any other number of driven pulleys may be used. Moreover, the size and/or shape of any of driven pulleys may vary in different embodiments.

In some cases, one or more driven pulleys may be connected to shafts associated with one or more engine components or vehicle components in addition to alternator 104. In some cases, some of the driven pulleys may be connected to shafts associated with a water pump, an air conditioning system, an oil pump and/or any other engine or vehicle components. In the current embodiment, alternator pulley 122 is associated with alternator 104 and is used to provide torque to alternator 104, as further described below. Additionally, in some embodiments, one or more of the driven pulleys could be idler pulleys that are not connected directly to the shafts of engine components or vehicle components.

It should be understood that the current embodiment of drive system 108 is only intended as an example. In other embodiments, any other arrangement for drive system 108 may be used. For example, in other embodiments, drive system 108 could comprise any number of pulleys and belts configured in any arrangement.

In some embodiments, engine idle stability control system 100 may include alternator (ACG) 104. In one embodiment, alternator 104 includes an alternator pulley 122 that is mechanically connected with engine 102 by drive system 108. In some embodiments, a current is generated as a rotor in alternator 104 rotates due to torque applied from alternator pulley 122 in communication with engine 102. In particular, as a crankshaft of engine 102 rotates, driving pulley 124 drives alternator pulley 122 through belt 120. As alternator pulley 122 rotates, torque is applied to the rotor of alternator 104 which causes the rotor to spin with respect to a stator in alternator 104. The magnetic field caused by the spinning rotor and its excitation current will induce an alternating current within the stator. The alternating current in the stator converts the induced current into power that can be supplied to a battery and other components of the motor vehicle.

For purposes of clarity, only some components of alternator 104 are shown and discussed in this detailed description. In other embodiments, any other components known in the art may be used with alternator 104 for generating power that may be supplied to a battery or any other vehicle components. Moreover, the arrangement of components in the current embodiment is only intended to be exemplary and in other embodiments any other configuration can be used. One exemplary configuration for an alternator is discussed in U.S. Pat. No. 6,969,935, the entirety of which is hereby incorporated by reference.

In some embodiments, alternator 104 may include an ACG sensor 106. ACG sensor 106 may be configured to detect one or more parameters associated with an input and/or output of alternator 104. In some embodiments, ACG sensor 106 may be a current sensor that is configured to detect one or more currents associated with alternator 104. In one embodiment, ACG sensor may detect one or more of a field excitation current and a field excitation percentage. In an exemplary embodiment, ACG sensor 106 may be a magnetic field sensor, including a Hall Effect sensor. In some cases, ACG sensor 106 may be any known sensor associated with alternator 104 that is configured to detect parameters associated with input and/or output of alternator 104.

In some embodiments, engine idle stability control system 100 may include provisions for communicating with, and in some cases controlling, engine 102, alternator 104, and the various components associated with the motor vehicle. In some embodiments, engine idle stability control system 100 may be associated with a computer or similar device. In some embodiments, engine idle stability control system 100 may include a computer or a processor for receiving one or more signals from sensors associated with various systems and/or components of the motor vehicle and for using the signals to control the engine idle stability.

In the current embodiment, engine idle stability control system 100 may include an electronic control unit 110, hereby referred to as ECU 110. In one embodiment, ECU 110 may be configured to communicate with, and/or control, various components of engine idle stability control system 100, including, but not limited to, engine 102 and/or alternator 104. In addition, in some embodiments, ECU 110 may be configured to control additional components of a motor vehicle that are not shown. In an exemplary embodiment, ECU 110 may further include a memory. The memory may include storage for information received by ECU 110, as well as storage for one or more databases used by engine idle stability control system 100.

In some embodiments, ECU 110 may be configured to receive and/or transmit one or more signals to and/or from various components of engine idle stability control system 100. In an exemplary embodiment, ECU 110 may receive signals containing information associated with engine 102 from one or more sensors configured to detect parameters associated with engine 102. In some cases, sensors may include one or more of an engine speed sensor, a throttle position sensor, a crank angle sensor, an intake pressure sensor, as well as any other known sensor used to detect parameters associated with an engine. In some embodiments, engine idle stability control system 100 may include a throttle position sensor associated with the throttle valve. The throttle position sensor may be configured to provide information associated with a throttle position of the throttle valve. In an exemplary embodiment, the throttle position sensor may be configured to provide a signal associated with the throttle position to ECU 110. Additionally, ECU 110 may receive signals containing information associated with alternator 104 from one or more sensors configured to detect parameters associated with alternator 104, including ACG sensor 106. In addition, in other embodiments, ECU 110 may be configured to receive signals from various sensors containing information associated with additional components of a motor vehicle that are not shown.

In some embodiments, ECU 110 may transmit control signals to one or more components of engine idle stability control system 100, including engine 102 and/or alternator 104. In an exemplary embodiment, ECU 110 may be configured to generate control commands for controlling an output of engine 102, including, but not limited to, air intake amounts, ignition timing, fuel quantity, as well as other parameters associated with engine 102. Additionally, in some embodiments, ECU 110 may be configured to generate control commands for controlling a desired output of alternator 104, including, but not limited to, power output, excitation current demand, as well as other parameters associated with alternator 104.

ECU 110 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards. In various embodiments, ports may be part of a local interconnect network or any other vehicle communication network.

Figure 2:
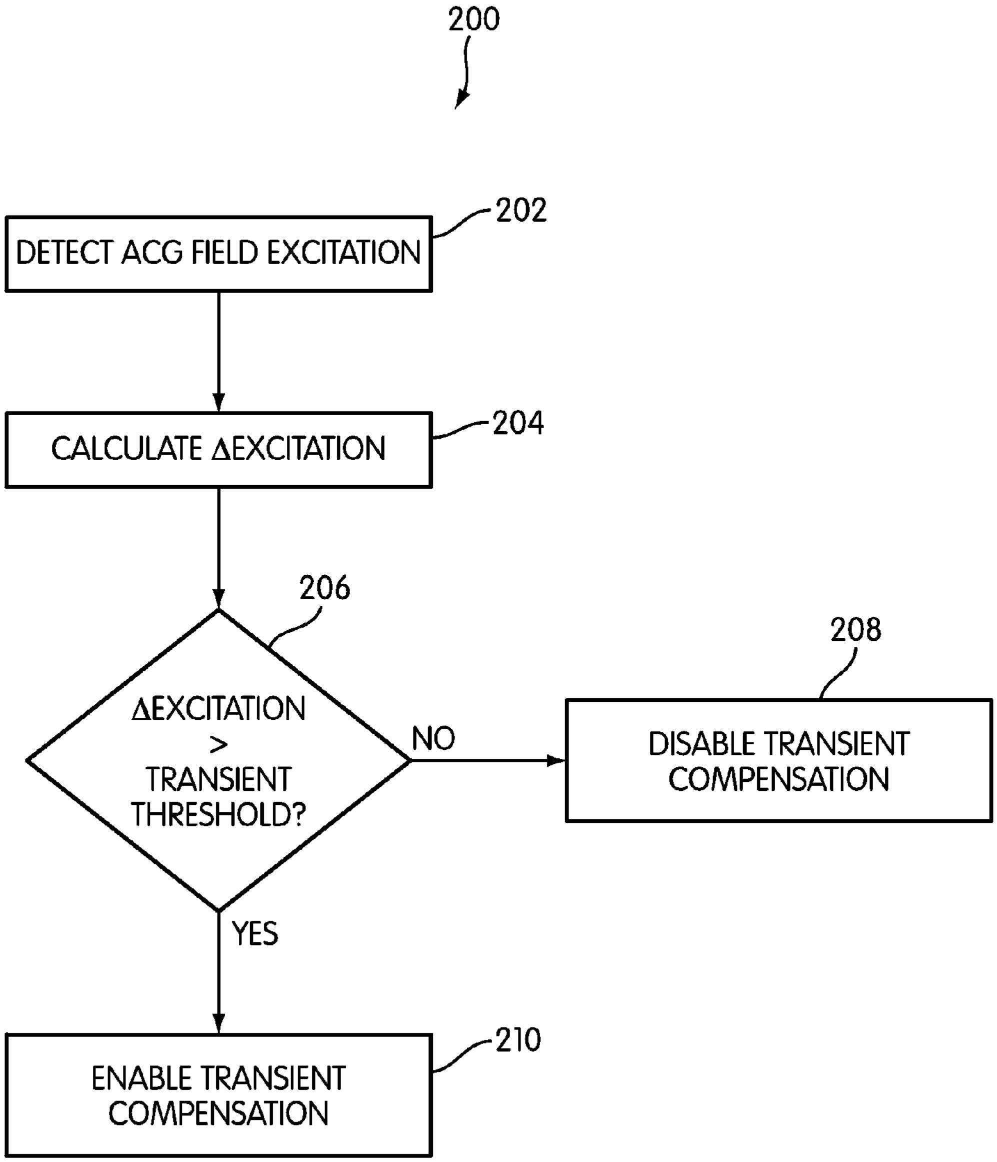
FIG. 2 is a schematic view of an exemplary embodiment of a process for using a detected excitation current from an alternator to enable engine output compensation.

Referring now to FIG. 2, an exemplary embodiment of a process 200 for using a detected excitation current from an alternator to enable engine output compensation is illustrated. The order of the steps included in process 200 is merely exemplary and may be performed in any order. In some embodiments, the motor vehicle may include engine idle stability control system 100 configured to perform process 200. In an exemplary embodiment, process 200 may be performed by ECU 110. In some embodiments, process 200 may detect an alternator field excitation current associated with alternator 104 at step 202. The alternator field excitation current is directly related to the output torque of alternator 104. In some cases, the alternator field excitation current may be detected using ACG sensor 106. In other cases, the alternator field excitation current may be estimated or determined by ECU 110 using information associated with alternator 104.

In some embodiments, the detected alternator field excitation current at step 202 may include one or more of an actual excitation current value and an excitation percentage value of total excitation current. In one embodiment, the detected alternator field excitation current, including values associated with actual excitation current and/or excitation percentage, may be filtered. In an exemplary embodiment, a moving average filter may be used to provide filtered alternator feedback information. In other embodiments, other known filters or data processing algorithms may be used to provide filtered or processed alternator feedback information. With this arrangement, fluctuations or anomalies in alternator feedback information may be compensated for and/or smoothed.

Next, a change in the alternator field excitation current is calculated at step 204. If an electric load is applied in the motor vehicle, the alternator field excitation current will increase rapidly to output more power from alternator 104. In an exemplary embodiment, the change in the alternator field excitation current is calculated at step 204 to identify this rapid change in required alternator output. At step 206, the calculated change in alternator field excitation current is compared to a threshold. In some cases, the threshold may be a predetermined value based on fixed criteria. In other cases, the threshold may be determined based on variable criteria. In still other cases, the threshold may be determined based on information associated with one or more additional components of the motor vehicle.

In the current embodiment, the change in alternator field excitation current is compared to a transient threshold value at step 206. In an exemplary embodiment, the transient threshold value is associated with an upper threshold value for a change in the alternator field excitation current over a defined interval of time. In some embodiments, when the change in the alternator field excitation current exceeds the transient threshold value at step 206, then process 200 enables transient engine output compensation at step 210. If, however, the change in the alternator field excitation current does not exceed the transient threshold value at step 206, then transient engine output compensation is disabled at step 208. In some embodiments, process 200 may be repeated. In some cases, process 200 may be repeated on a periodic basis. In other cases, process 200 may be repeated in response to a triggering event. In still other cases, process may repeat a specified number of times.

In some embodiments, the transient threshold at step 206 may further include hysteresis. In one embodiment, the transient threshold with hysteresis includes a first threshold value and a second threshold value. In an exemplary embodiment, the first threshold value may be associated with an upper threshold value and the second threshold value may be associated with a lower threshold value. With this arrangement, once the change in alternator field excitation current is determined to be larger than the first or upper transient threshold value at step 206, transient engine output compensation at step 210 continues until such time as the change in alternator field excitation current falls below the second or lower threshold value. In an exemplary embodiment, the first or upper transient threshold value is larger than the second or lower transient threshold value. Applying the transient threshold value with hysteresis at step 206, the change in the alternator field excitation current must fall below the lower transient threshold value before transient engine output compensation is disabled at step 208.

In other embodiments, transient engine output compensation may be disabled at step 208 based on a termination event. In some cases, the termination event may be a change in the excitation current that is less than a threshold value, as described above. In other cases, the termination event may be expiration of a fixed amount of time. In still other cases, the termination event may be a separate process that may be used to judge whether to disable the engine output compensation. In some embodiments, the type of termination event may be selected based on the type of engine output compensation that is being implemented. In some cases, the termination event associated with an engine air amount compensation may include comparison of an excitation current with a threshold value and/or expiration of a timer. In other cases, the termination event associated with an engine timing compensation may include a separate process to judge whether to disable the engine output compensation. In one embodiment, an idle stability judgment may be used to determine whether to disable the engine output compensation, as described with regard to FIG. 9 below.

Figure 3:
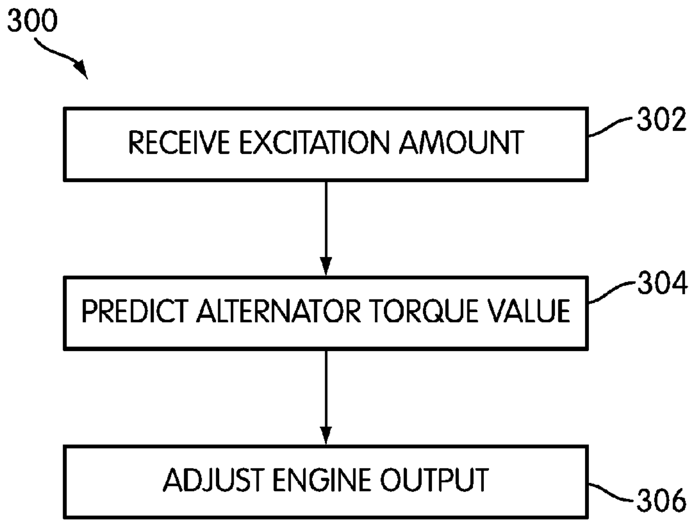
FIG. 3 is schematic view of an exemplary embodiment of a process for using feedback from an alternator for adjusting engine output compensation.

Referring now to FIG. 3, an exemplary embodiment of a process 300 for using feedback from an alternator for adjusting engine output compensation is illustrated. In an exemplary embodiment, process 200, described above, first may be used to determine that transient engine output compensation should be enabled. The order of the steps included in process 300 is merely exemplary and may be performed in any order. In some embodiments, the motor vehicle may include engine idle stability control system 100 configured to perform process 300. In an exemplary embodiment, process 300 may be performed by ECU 110.

In some embodiments, process 300 may be used to determine the amount and/or type of engine output compensation needed to maintain engine idle stability. In this embodiment, process 300 may first receive alternator feedback information at step 302. In an exemplary embodiment, alternator feedback information may include the alternator field excitation current. In some embodiments, the alternator field excitation current, as described above, may include one or more of an actual excitation current value and an excitation percentage value of total excitation current. In an exemplary embodiment, the excitation amount received at step 302 may include both the actual excitation current value and the excitation percentage value. In other embodiments, other alternator feedback information may be received at step 302.

Next, process 300 may predict the alternator torque value at step 304. In an exemplary embodiment, the predicted alternator torque value at step 304 may be determined based on a predicted alternator excitation current, as further described in reference to FIG. 4 below. In an exemplary embodiment, the predicted alternator torque value at step 304 may be determined as a function of the alternator speed and the predicted alternator excitation current. Based on the predicted alternator torque value from step 304, engine output compensation may be adjusted at step 306 to take into account the change in load from alternator 104. With this arrangement, adjustment of engine output compensation may be applied at step 306 at the onset of the load change caused by the increase in alternator torque output. Additionally, engine output compensation may be maintained during and/or after the load change has occurred. In some cases, engine output compensation may include one or more of engine air amount compensation and engine timing compensation, as further discussed below. In other cases, engine output compensation may include other known techniques for changing the output torque of an engine, including, but not limited to, fuel amount compensation, valve timing compensation, activation of additional cylinders and/or engines, as well as other methods of increasing or supplementing engine torque.

Figure 4:
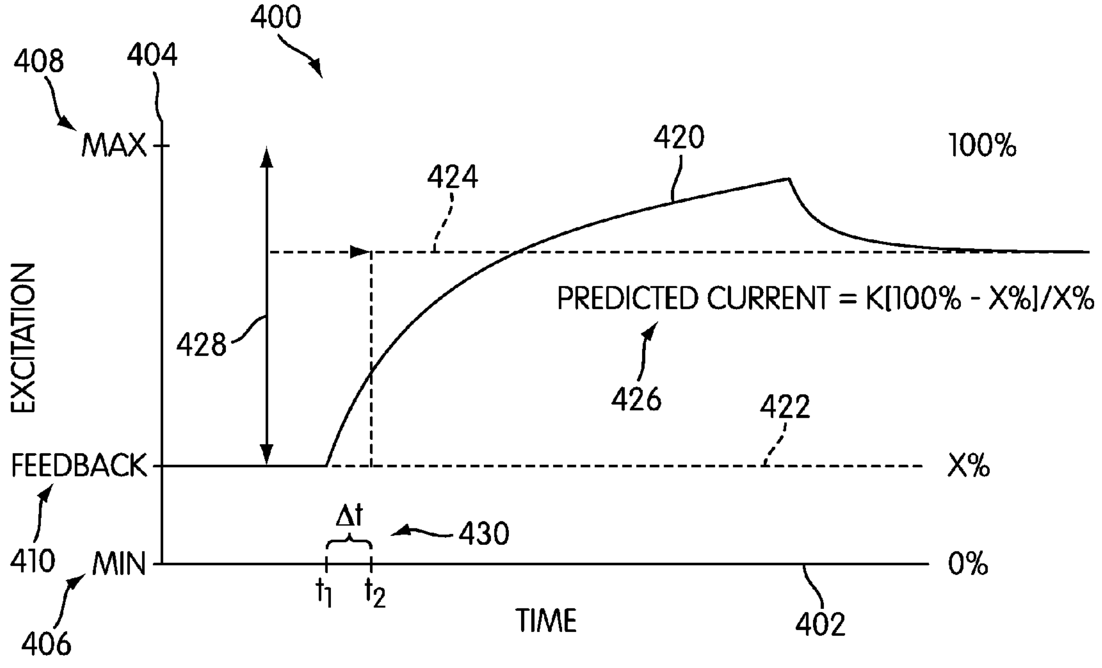
FIG. 4 is a representational view of an exemplary embodiment of a relationship between excitation current and time.

Referring now to FIG. 4, an exemplary embodiment of a relationship 400 between excitation current and time is illustrated. In some embodiments, the predicted alternator excitation current used to determine the predicted alternator torque value at step 304, above, may be calculated using the relationship shown in FIG. 4. In this embodiment, relationship 400 between time along time axis 402 and excitation current along excitation axis 404 is shown. In some embodiments, excitation current values associated with alternator 104 may fall along excitation axis 404 between a minimum value 406 and a maximum value 408. In an exemplary embodiment, excitation current values along excitation axis 404 may be expressed as percentages of total excitation current capacity associated with alternator 104. In this embodiment, minimum value 406 represents 0% of excitation current and maximum value 408 represents 100% of excitation current. In an exemplary embodiment, alternator feedback information may be provided from alternator 104 and displayed along excitation axis 404 as feedback value 410. In one embodiment, feedback value 410 may also be expressed as a percentage of excitation current. In this case, feedback value 410 represents X %, a variable amount between 0% and 100%.

Next, the process of determining the predicted alternator excitation current will be explained with reference to relationship 400. In some embodiments, a rapid change in alternator excitation current may be detected during a time interval 430. During time interval 430, alternator excitation current received as alternator feedback information from alternator 104 may rise to an upper level 420 from a baseline level 422. Based on this detected rapid rise during time interval 430, engine idle stability control system 100 may predict that the alternator excitation current will increase. However, the change in alternator excitation current amount during time interval 430 may not correlate to the increase in electric load amount. Accordingly, engine idle stability control system 100 may use the alternator feedback information to determine a predicted alternator excitation current.

In some embodiments, the actual change in excitation current may fall into a range 428 between baseline level 422 and maximum value 408. In an exemplary embodiment, engine idle stability control system 100 may calculate range 428 where a final alternator excitation current may fall. Next, the system may target a specific value within range 428 as the predicted alternator excitation current based on a prediction factor K. In some embodiments, prediction factor K may be experimentally derived. In other embodiments, prediction factor K may be based on one or more properties or characteristics associated with alternator 104, engine 102, and/or any additional components of the motor vehicle. In an exemplary embodiment, a predicted current equation 426 may be used as shown in FIG. 4 to calculate the predicted alternator excitation current. In one embodiment, predicted current equation 426 may be equal to the prediction factor K multiplied by the product of range 428 divided by baseline value 422, i.e., Predicted Current=K[100%−X %]/X %. In this embodiment, using predicted current equation 426 results in a predicted alternator excitation current value 424. With this arrangement, predicted alternator excitation current value 424 may be used to determine the necessary engine idle stability compensation at the onset of the actual electric load change. Additionally, in some embodiments the engine idle stability compensation may be maintained during and/or after the load change has occurred.

Figure 5:
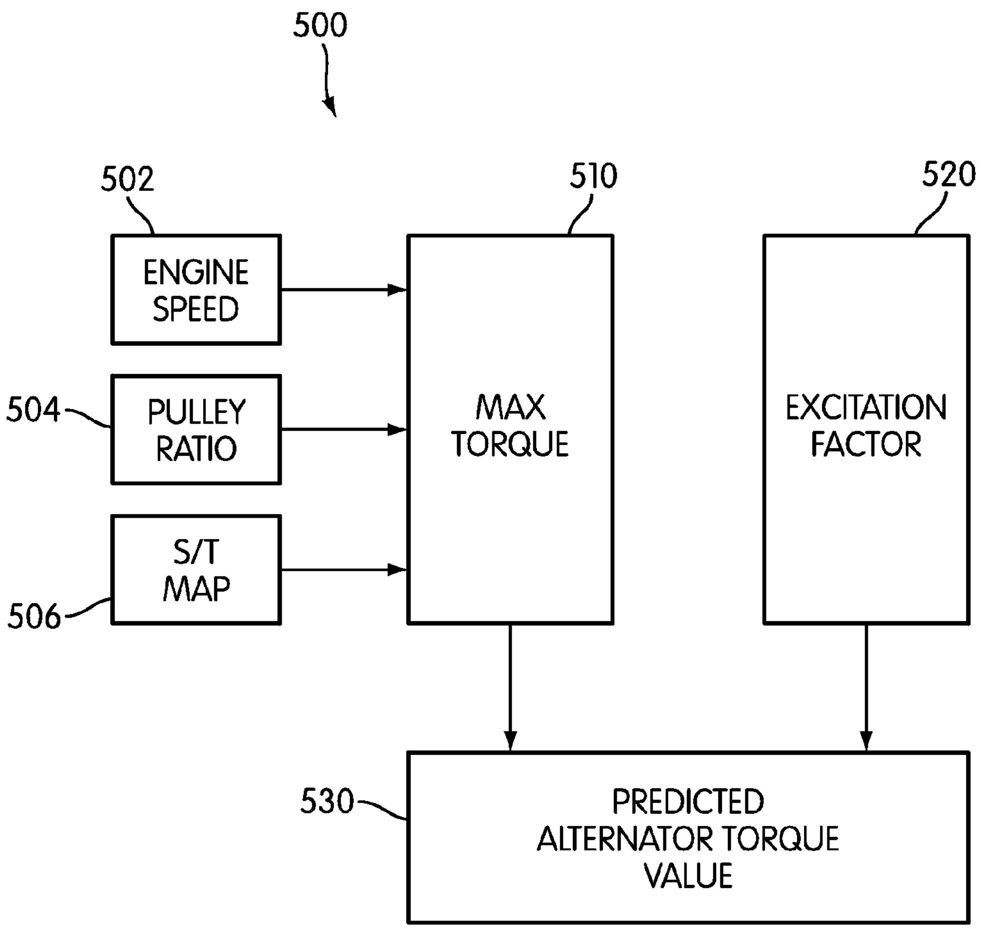
FIG. 5 is a schematic view of an exemplary process for determining a predicted alternator torque.

Referring now to FIG. 5, a schematic view of a process 500 for determining a predicted alternator output torque value based on the predicted alternator excitation current is illustrated. Generally, the alternator output torque value may be determined as a function of the speed of the alternator and the alternator excitation current. Accordingly, the predicted alternator output torque value may be determined based the predicted alternator excitation current. In some embodiments, the predicted alternator excitation current may be calculated as explained above in reference to FIG. 4. Next, process 500 for determining the predicted alternator output torque value may be explained as shown schematically in FIG. 5.

In some embodiments, a maximum output torque value 510 for alternator 104 may be determined based on information associated with an engine speed, a pulley ratio, and a speed-torque map. First, using an engine speed rotational value 502 from an engine speed sensor associated with engine 102 and a pulley ratio 504 associated with alternator pulley 122 and driving pulley 124, the alternator speed may be determined. Next, a maximum output torque value 510 may be determined as a function of alternator speed by using a speed-torque map 506. In an exemplary embodiment, speed-torque map 506 includes a look-up table that correlates maximum output torque value 510 to various values of alternator speeds and/or engine speeds. In one embodiment, speed-torque map 506 may be stored on the motor vehicle as a database in a memory accessible by engine idle stability control system 100, including ECU 110. In some cases, speed-torque map 506 may be obtained from a supplier of alternator 104. In other cases, speed-torque map 506 may be obtained based on acquired test data.

In some embodiments, the predicted alternator output torque value 530 may be calculated based on maximum output torque value 510 and the predicted alternator excitation current. In an exemplary embodiment, the predicted alternator excitation current may be used to determine an excitation factor 520. In one embodiment, excitation factor 520 may represent the proportion of the predicted alternator excitation current to the maximum excitation current. In some cases, excitation factor 520 may be represented as a percentage. With this arrangement, predicted alternator output torque value 530 may be calculated as the product of excitation factor 520 and maximum output torque value 510.

Figure 6:
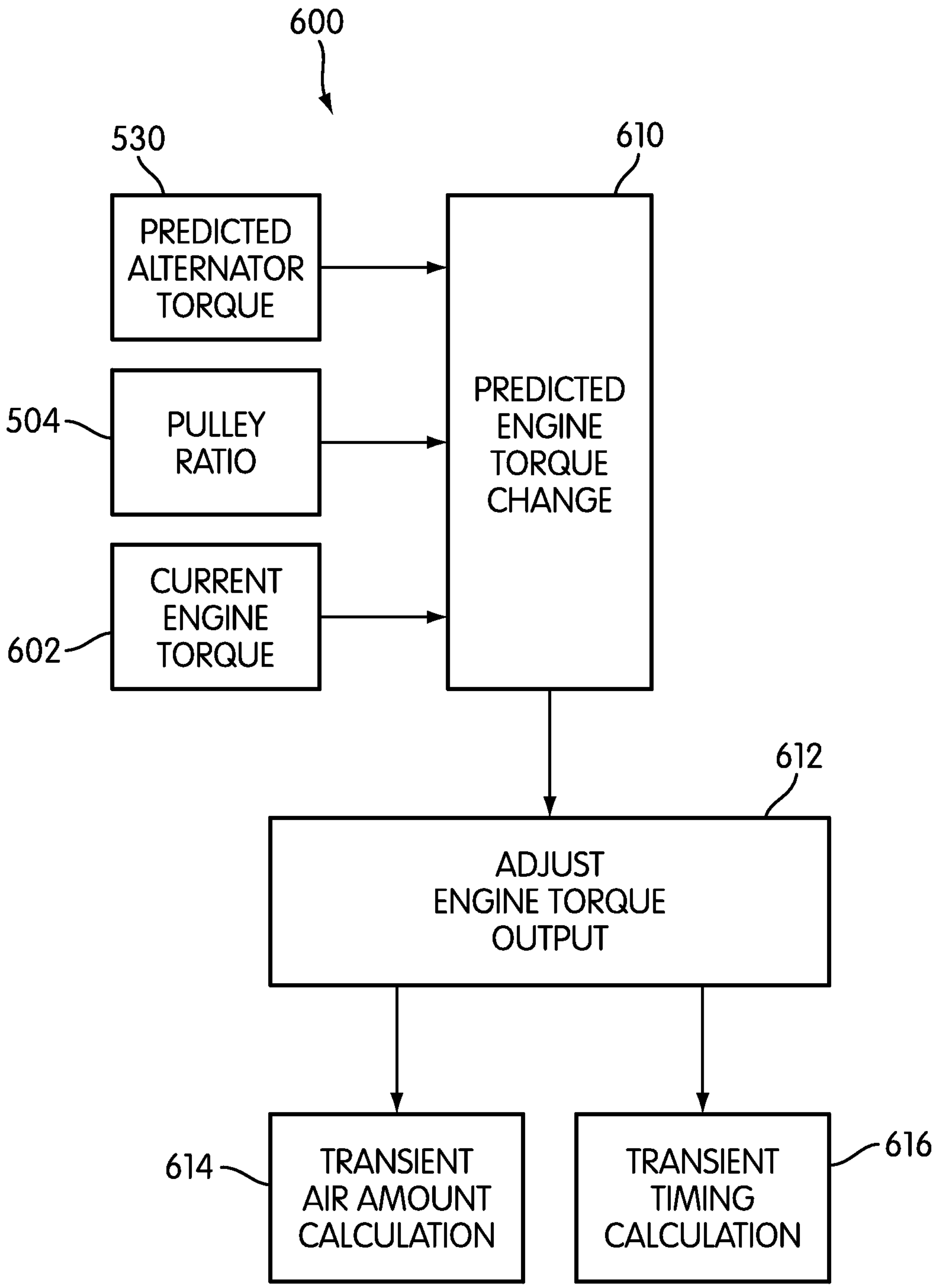
FIG. 6 is a schematic view of an exemplary process for determining and implementing an engine output adjustment.

Referring now to FIG. 6, a schematic view of a process 600 for determining and implementing an engine output adjustment is illustrated. In some embodiments, predicted alternator output torque value 530 may be used as an input by process 600 to determine a predicted engine torque change 610. In an exemplary embodiment, predicted alternator torque output 530 may be determined using process 500, as described above. Next, process 600 may use pulley ratio 504 associated with alternator pulley 122 and driving pulley 124 together with predicted alternator torque output 530 to calculate a predicted engine torque output. In an exemplary embodiment, the predicted engine torque output may be compared with a current engine torque output 602 to calculate predicted engine torque change 610.

In some embodiments, predicted engine torque change 610 may be used by engine idle stability control system 100 to implement an engine output torque adjustment 612. In this embodiment, engine idle stability control system 100 may adjust engine output torque 612 to compensate for predicted engine torque change 610 at the onset of the actual electric load change, as well as during and/or after the load change has occurred. With this arrangement, engine idle speed variation due to increased electric load may be limited.

In some embodiments, engine output torque adjustment 612 may include one or more of an engine air amount compensation and an engine timing compensation. In an exemplary embodiment, engine output torque adjustment 612 may include a transient air amount calculation 614 for adjusting the amount of air supplied to engine 102 by an air intake that is needed to compensate for predicted engine torque change 610. In some cases, the air amount may be supplied to engine 102 using a throttle valve. In other cases, the air amount may be supplied to engine 102 using other intake devices. In one embodiment, transient air amount calculation 614 may be a look-up table that correlates an air amount to an engine output torque value. In other embodiments, transient air amount calculation 614 may be a formula that relates air amounts to engine output torque values. With this arrangement, engine idle control system 100 may supply an air amount to engine 102 to compensate for predicted engine torque change 610 using transient air amount calculation 614.

In an another exemplary embodiment, engine output torque adjustment 612 may include a transient timing calculation 616 for adjusting the ignition timing associated with engine 102 to compensate for predicted engine torque change 610. In some embodiments, transient timing calculation may advance and/or retard engine ignition timing to increase or decrease the engine output torque. In one embodiment, transient timing calculation 616 may advance the engine timing to a predetermined value to increase the amount of engine output torque produced by engine 102. In another embodiment, transient timing calculation 616 may be used to advance and/or retard engine timing based on whether the engine speed is above or below a target engine speed. With this arrangement, fluctuations in the engine speed caused by overshoot and/or undershoot of the target engine speed may be controlled. In an exemplary embodiment, transient timing calculation 616 may be used by engine idle control system 100 when a rapid predicted engine torque change 610 is detected, as described below. In different embodiments, engine idle control system 100 may use transient air amount calculation 614 and/or transient timing calculation 616 in combination to varying degrees, or separately, in various circumstances, to implement engine output torque adjustment 612 necessary to maintain engine idle stability as a result of predicted engine torque change 610.

Figure 7:
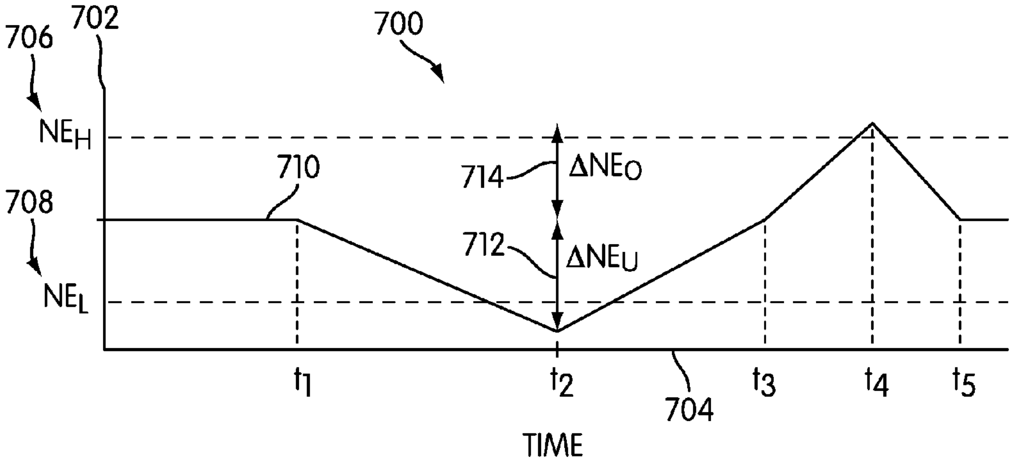
FIG. 7 is a representational view of a conventional relationship between engine speed and time with an alternator torque event.
Figure 8:
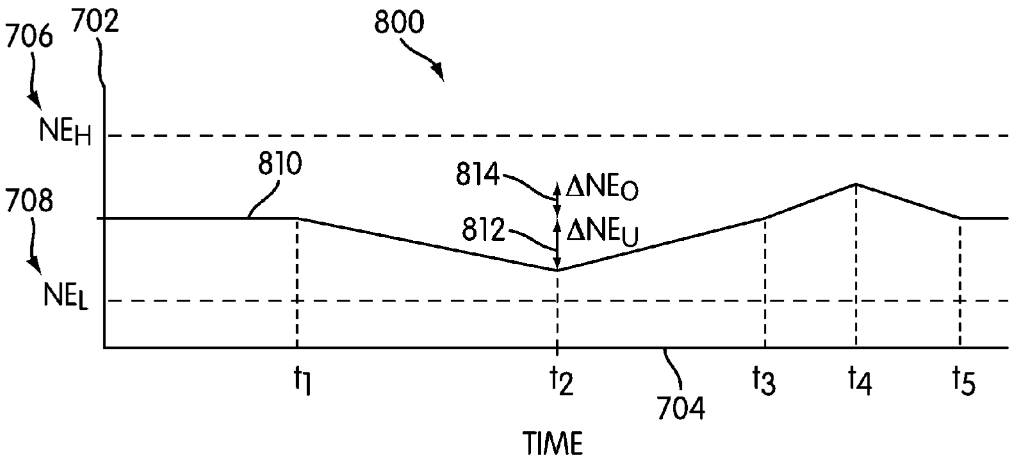
FIG. 8 is a representational view of an exemplary embodiment of a relationship between engine speed and time with engine idle stability control based on feedback from an alternator.

FIGS. 7 and 8 illustrate a comparison of engine idle stability of a conventional motor vehicle and a motor vehicle with engine idle control system 100 described herein. FIGS. 7 and 8 illustrate the relationships between engine speed along engine speed axis 702 and time along time axis 704 during an alternator torque event. In some embodiments, the engine speed may typically vary during operation between a high value 706 and a low value 708 along engine speed axis 702. In some cases, however, changes in engine operation may result in the engine speed falling outside of the range between high value 706 and low value 708. In an exemplary embodiment, the performance and handling characteristics of an engine, as well as driving comfort, may be negatively affected when the engine speed falls below low value 708 or rises above high value 706. For example, in some cases, an engine speed change may result in a resonance between the engine and the steering column, causing an unwanted vibration experienced by the driver.

Referring now to FIG. 7, a conventional relationship 700 between engine speed and time with an alternator torque event is illustrated. In this situation, an actual engine speed 710 may be detected. At a first time t1, an alternator torque event may begin. Accordingly, actual engine speed 710 may decrease from first time t1 to a second time t2, at which time the alternator torque output caused by the electric load causes the largest change in engine torque output. As shown in FIG. 7, the decrease in actual engine speed 710 may result in an engine speed change 712. In this situation, engine speed change 712 is sufficient to reduce actual engine speed 710 below low value 708, thereby negatively affecting engine performance. In some conventional systems, actual engine speed 710 may be adjusted between second time t2 and third time t3 to correct for engine speed change 712. Thus, in conventional relationship 700, the system is reactive to engine speed change 712 caused by the increase in alternator torque on the engine.

In some cases, the conventional system may continue to adjust for the increased alternator torque on the engine between third time t3 and a fourth time t4, resulting in an engine speed change 714 associated with an overshoot condition at fourth time t4. In this situation, engine speed change 714 has overcorrected for the increased torque on the engine, causing actual engine speed 710 to rise above high value 706. Additionally, in some systems, actual engine speed 710 may need to be adjusted again between fourth time t4 and a fifth time t5 to bring actual engine speed 710 back below high value 706 after the overshoot condition at fourth time t4.

Referring now to FIG. 8, an exemplary embodiment of a relationship 800 between engine speed and time with engine idle stability control based on feedback from an alternator as described herein is illustrated. In contrast to conventional relationship 700, exemplary relationship 800 may quickly adjust engine output torque caused by a predicted increase in alternator torque. As shown in FIG. 8, in this embodiment, an actual engine speed 810 may be detected. At a first time t1, an alternator torque event may begin. As described above, the alternator torque event may be associated with a rapid change in the alternator excitation field current. Using the processes described above, the change in alternator excitation field current is detected and the predicted alternator excitation current is calculated. As explained in more detail above, engine output torque compensation may then be started. Accordingly, actual engine speed 810 may only slightly decrease from first time t1 to a second time t2, at which time the alternator torque output caused by the electric load causes the largest change in engine torque output.

As shown in FIG. 8, the decrease in actual engine speed 810 may result in an engine speed change 812. In this embodiment, engine speed change 812 is insufficient to reduce actual engine speed 810 below low value 708. With this arrangement, actual engine speed 810 may be prevented from falling below low value 708, thus avoiding negative engine performance associated with conventional relationship 700.

In some embodiments, engine output compensation may continue to increase engine torque output between third time t3 and a fourth time t4, causing an engine speed change 814 associated with an overshoot condition at fourth time t4. In an exemplary embodiment, engine output compensation, as described above, may be used to adjust engine output torque to reduce actual engine speed 810 to a target engine speed at a fifth time t5. With this arrangement, engine output compensation may be used to quickly react to the overshoot condition at fourth time t4 and to reduce the amount of engine speed change 814 associated with the overshoot condition. Therefore, engine speed change 814 associated with the overshoot condition in the current embodiment may be smaller than the engine speed change 714 associated with the overshoot condition in a conventional system, as shown in FIG. 7 above.

In some embodiments, engine output torque compensation may include one or more of an engine air amount compensation and an engine timing compensation, as described above. In some embodiments, engine air amount compensation and/or engine timing compensation may be used to compensate for a decrease in engine speed associated with engine speed change 812. Similarly, in some embodiments, engine air amount compensation and/or engine timing compensation may be used to compensate for an increase in engine speed associated with engine speed change 814. In another embodiment, different types of engine output compensation may be used to compensate for engine speed change 812 and engine speed change 814. In an exemplary embodiment, engine timing compensation may be used to compensate for the overshoot condition associated with engine speed change 814.

Figure 9:
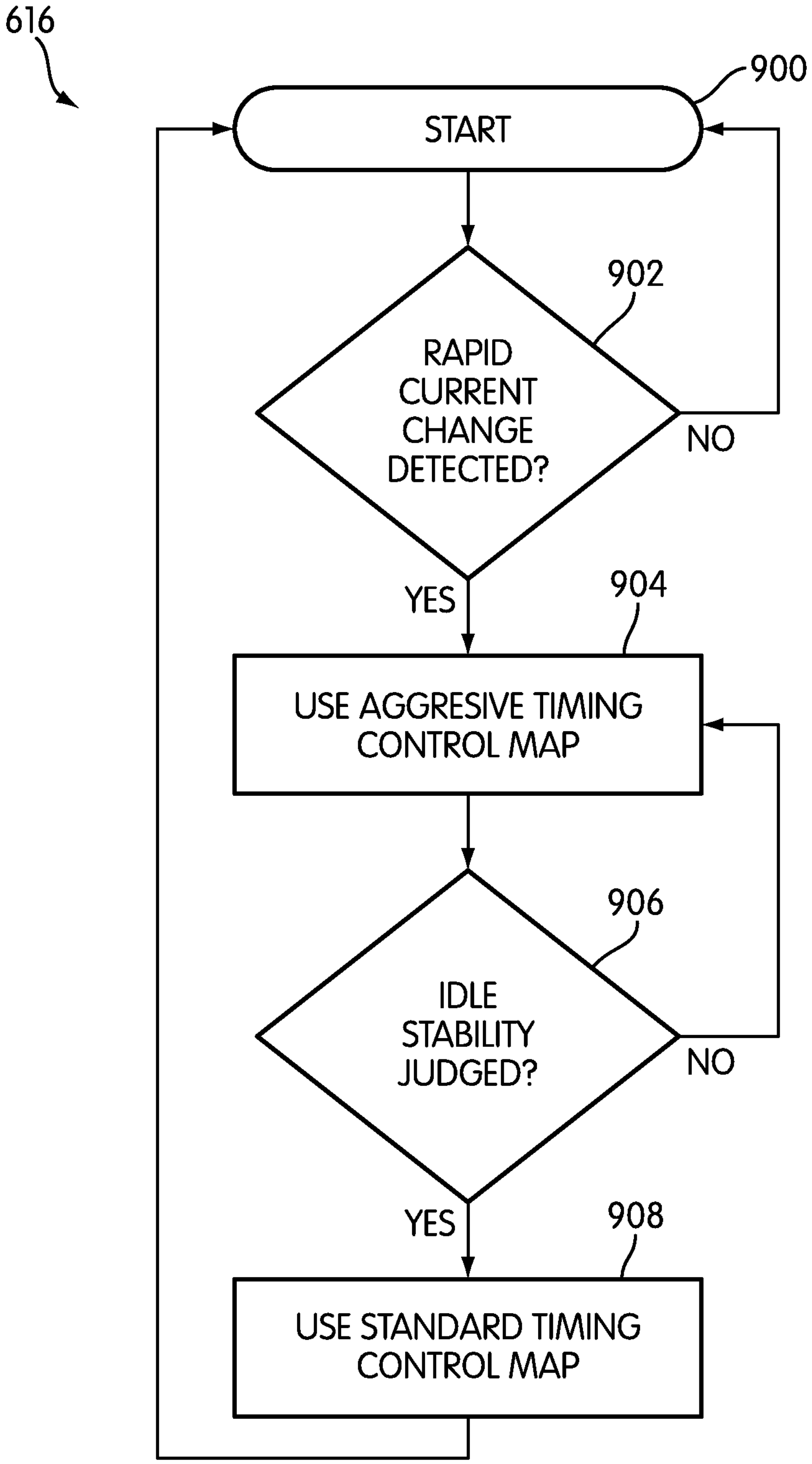
FIG. 9 is a schematic view of an exemplary embodiment of a process for engine timing control for adjusting engine output compensation.

Referring now to FIG. 9, an exemplary embodiment of a process for engine timing control for adjusting engine output compensation is illustrated. In some embodiments, engine timing control may use different engine ignition timing maps for controlling the engine timing during engine output compensation. In other embodiments, engine timing control may be increased or decreased using an algorithm or formula to adjust the engine timing during engine output compensation.

In this embodiment, engine timing compensation 616 may be used for engine idle stability control, as described above. First, engine timing compensation 616 process may start at step 900 when engine idle stability control system determines that engine output compensation is needed, as described above. Next, at step 902, the process checks whether a rapid change in the excitation current is detected, as described above. If a rapid change is not detected at step 902, the process returns to step 900. In some embodiments, engine timing compensation 616 process may then be repeated. In some embodiments, however, if a rapid change is detected at step 902, then the process switches engine ignition timing to an aggressive timing control map at step 904. In some embodiments, the aggressive timing control map may increase and/or decrease engine timing to a greater degree than a standard timing control map, as further described below and shown in FIG. 10.

In an exemplary embodiment, the aggressive timing control map at step 904 may be used to increase and/or decrease engine output torque to reduce changes in the engine speed caused by an increase in alternator output torque. In some embodiments, engine timing compensation 616 may continue to use the aggressive timing control map until idle stability is reached. In this embodiment, idle stability is judged at step 906. In some embodiments, idle stability may be judged using a timer. In an exemplary embodiment, the total change in engine speed associated with a decrease and/or increase in engine speed associated with an overshoot condition may be compared with a stability threshold. In another embodiment, the timer may be reset whenever the total change exceeds the stability threshold. In other embodiments, the timer may expire when the total change is less than the stability threshold for a predetermined amount of time. Until idle stability is judged at step 906, the process continues to use the aggressive timing control map set at step 904.

In this embodiment, once idle stability is judged to have been reached at step 906, then the process switches engine ignition timing to a standard timing control map at step 908. In some embodiments, once engine ignition timing has been changed back to the standard timing control map at step 908, the process may end and/or may return to step 900 until a rapid change in alternator excitation current is detected again at step 902.

Figure 10:
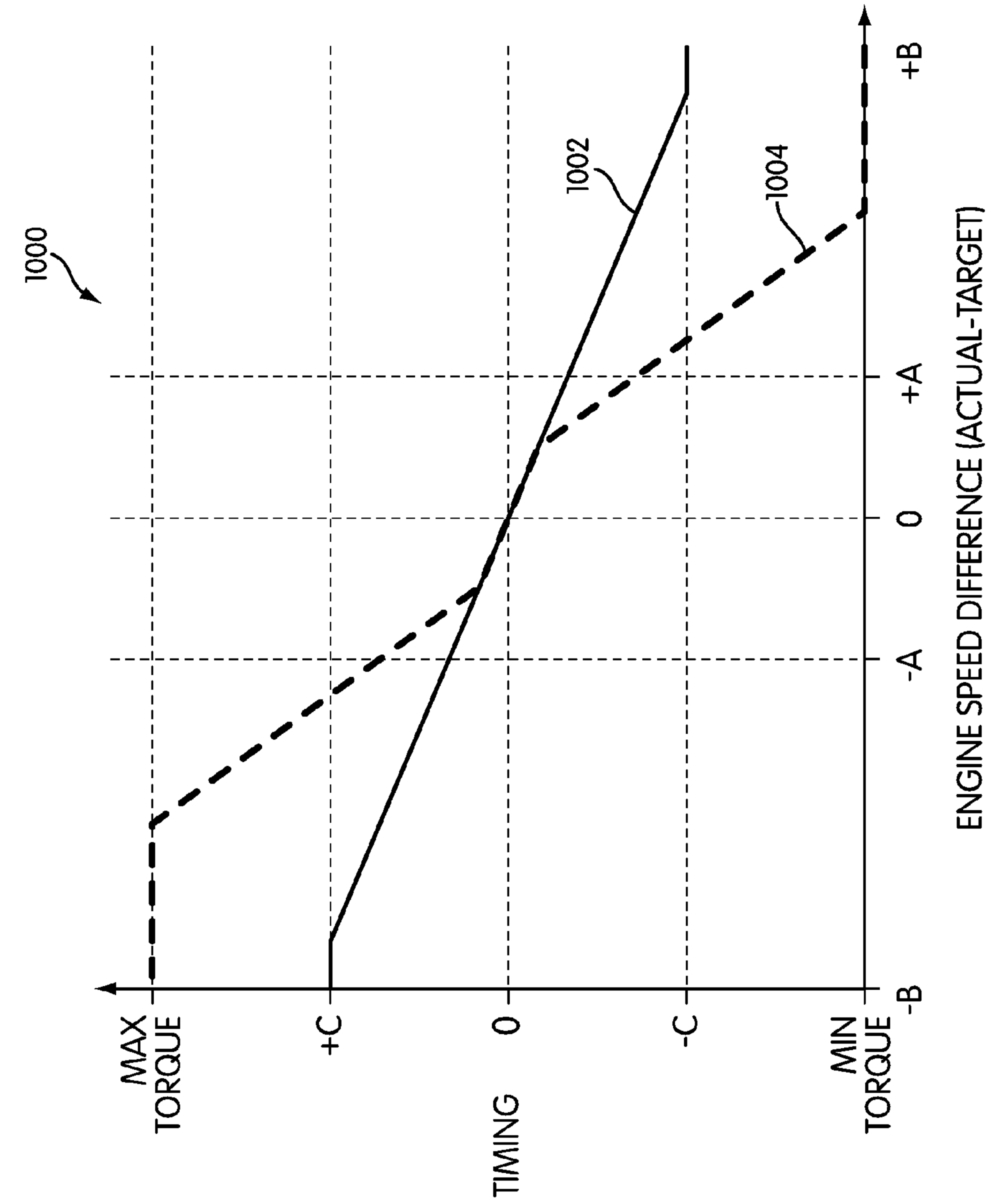
FIG. 10 is a representational view of exemplary embodiments of engine timing control maps for engine timing control.

FIG. 10 illustrates exemplary embodiments of engine timing control maps that may be used for engine timing control, as described above. In some embodiments, engine timing compensation may use one or more types of engine timing control maps 1000 to implement engine output compensation. In some embodiments, engine timing control maps 1000 may relate changes in engine timing, measured in degrees, to a corresponding increase or decrease in engine speed NE, measured in rpm. In an exemplary embodiment, engine timing control maps 1000 may relate changes in engine timing to a corresponding difference in engine speed between an actual engine speed and a target engine speed. In some cases, engine timing control maps 1000 may be used to advance and/or retard engine ignition timing to change the engine speed or the difference in engine speed between the actual engine speed and the target engine speed by a target amount.

In an exemplary embodiment, the difference in engine speed between the actual engine speed and the target engine speed may vary between a first range from plus or minus a first set value A. In some embodiments, the difference in engine speed between the actual engine speed and the target engine speed may vary between a second range from plus or minus a second set value B. In some cases, first set value A may be a minimum positive or negative difference in engine speed. In some cases, second set value B may be a maximum positive or negative difference in engine speed. In other cases, any of first set value A and second set value B may be set to any amount or may be variable.

In an exemplary embodiment, engine timing control maps 1000 may include a first control map 1002. In one embodiment, first control map 1002 may be a standard timing control map. In some embodiments, first control map 1002 may advance and/or retard ignition timing within a specified range between a maximum and a minimum amount. In this embodiment, first control map 1002 may advance and/or retard ignition timing plus or minus a predetermined amount C of degrees. In an exemplary embodiment, first control map 1002 may advance and/or retard ignition timing plus or minus ten degrees. In other embodiments, first control map 1002 may advance and/or retard ignition timing by different amounts more or less than ten degrees. In still other embodiments, predetermined amount C may be set to any amount or may be variable.

In an exemplary embodiment, engine timing control maps 1000 may include a second control map 1004. In one embodiment, second control map 1004 may be an aggressive timing control map. In some embodiments, second control map 1004 may advance and/or retard ignition timing within a specified range between a maximum and a minimum amount. In this embodiment, second control map 1004 may advance and/or retard ignition timing between an amount associated with a maximum engine torque and an amount associated with a minimum engine torque. In one embodiment, the range associated with second control map 1004 may be greater than the range associated with first control map 1002. With this arrangement, in some cases where second control map 1004 is an aggressive timing control map, engine timing control may be advanced and/or retarded by a larger amount in either direction than first control map 1002, which may a standard timing control map. As a result, changes to engine speed may be made more responsive. In other embodiments, second control map 1004 may advance and/or retard ignition timing by different amounts more or less than amounts associated with the maximum and minimum engine torque.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method for controlling an engine in a motor vehicle, comprising the steps of:

detecting an excitation current associated with an alternator of the motor vehicle;

monitoring the excitation current over a first time interval;

determining a change in the excitation current associated with the first time interval;

comparing the change in the excitation current to a threshold value;

determining whether the change in the excitation current is greater than the threshold value; and enabling engine output compensation if the change in the excitation current over the first time interval is determined to be greater than the threshold value.

2. The method according to claim 1, further comprising the step of disabling engine output compensation upon a termination event.

3. The method according to claim 2, wherein the termination event is based on the type of engine output compensation.

4. The method according to claim 2, wherein the termination event includes at least one of: a determination that the change in the excitation current is less than the threshold value, an expiration of a timer, and a judgment that idle stability has been reached.

5. The method according to claim 1, wherein the threshold value is associated with a hysteresis.

6. The method according to claim 1, wherein the step of determining whether the change in the excitation current is greater than the threshold value further comprises:

determining whether the change in the excitation current is greater than a first threshold value;

comparing the change in the excitation current to a second threshold value, if the change in the excitation current is greater than the first threshold value; and wherein the second threshold value is smaller than the first threshold value.

7. The method according to claim 6, further comprising:

repeatedly comparing the change in the excitation current to the second threshold value for a period of time; and disabling engine output compensation if the change in the excitation current is less than the second threshold value.

8. The method according to claim 1, further comprising:

determining a predicted alternator excitation current value based on a difference between a maximum excitation current value and alternator feedback information.

9. The method according to claim 8, further comprising:

determining a predicted alternator torque output based on the predicted alternator excitation current value;

determining a predicted change in an engine output torque associated with the predicted alternator torque output; and calculating the engine output compensation based on the predicted change in engine output torque.

10. A control system in a motor vehicle for controlling an engine, comprising:

an engine;

a throttle valve associated with an air intake of the engine, the throttle valve configured to control an amount of air into the engine;

an alternator;

a current sensor associated with the alternator, the current sensor configured to detect an excitation current of the alternator;

an electronic control unit, the electronic control unit in communication with the current sensor and the throttle valve;

wherein the electronic control unit comprises a processor configured to:

detect an excitation current associated with the alternator of the motor vehicle from the current sensor;

monitor the excitation current over a first time interval to determine a change in the detected excitation current;

compare the excitation current to a threshold value; and control the throttle valve associated with the air intake of the engine when the change in the detected excitation current exceeds the threshold value.

11. The control system according to claim 10, wherein the processor is further configured to determine a predicted alternator excitation current value based on a difference between a maximum excitation current value and the detected excitation current.

12. The control system according to claim 10, wherein the processor controls the throttle valve associated with the air intake of the engine to increase the engine output torque to compensate for a predicted alternator output torque value.

13. The control system according to claim 12, wherein the predicted alternator output torque value is determined based on a predicted alternator excitation current value.

14. The control system according to claim 10, wherein the processor is further configured to control an engine timing associated with the engine when the change in the detected excitation current exceeds the threshold value.

15. The control system according to claim 14, wherein the processor adjusts the engine timing associated with the engine to compensate for a predicted alternator output torque value.

16. The control system according to claim 15, wherein the processor advances or retards the engine timing to achieve a target engine speed.

17. The control system according to claim 10, wherein the threshold value is associated with a hysteresis.

18. A method for controlling engine idle stability of an engine in a motor vehicle, comprising the steps of:

detecting an excitation current associated with an alternator of the motor vehicle;

determining whether a change in the excitation current is greater than a threshold value;

enabling engine output compensation if the change in the excitation current is determined to be greater than the threshold value;

wherein the step of enabling engine output compensation further comprises:

determining a predicted alternator output torque value;

calculating a predicted change in engine output torque based on the predicted alternator output torque value and a current engine output torque;

adjusting the engine torque output to compensate for the calculated predicted change in engine output torque;

wherein the step of adjusting the engine torque output to compensate for the calculated predicted change in engine output torque further comprises at least one of adjusting an air amount and adjusting an engine timing;

wherein adjusting the engine timing further includes using at least one engine timing control map selected from one or more of a first control map and a second control map; and wherein the first control map is a standard timing control map associated with a first range of values and the second control map is an aggressive timing control map associated with a second range of values that are greater than the first range of values.

19. The method according to claim 18, wherein the predicted alternator output torque value is determined using a predicted alternator excitation current value based on a difference between a maximum excitation current value and the detected excitation current.

20. The method according to claim 18, wherein adjusting the air amount further includes calculating an increase in air amount necessary to increase the engine output torque to compensate for the predicted change in engine output torque.

21. The method according to claim 18, wherein adjusting the engine timing further includes calculating a change in engine timing necessary to compensate for the predicted change in engine output torque.

22. The method according to claim 21, wherein calculating the change in engine timing further includes calculating an amount of ignition timing to be advanced or retarded to achieve a target engine speed.

23. The method according to claim 18, wherein enabling engine output compensation further comprises switching from the standard timing control map to the aggressive timing control map.

24. The method according to claim 18, further comprising the step of disabling engine output compensation upon a termination event.

25. The method according to claim 24, wherein the termination event is based on the type of engine output compensation.

26. The method according to claim 24, wherein the termination event includes at least one of: a determination that the change in the excitation current is less than the threshold value, an expiration of a timer, and a judgment that idle stability has been reached.

* * * * *